W. WRIGHT.
COMPUTING MACHINE.
APPLICATION FILED MAR. 8, 1912.
1,261,088.
Patented Apr. 2, 1918.
3 SHEETS—SHEET 1.
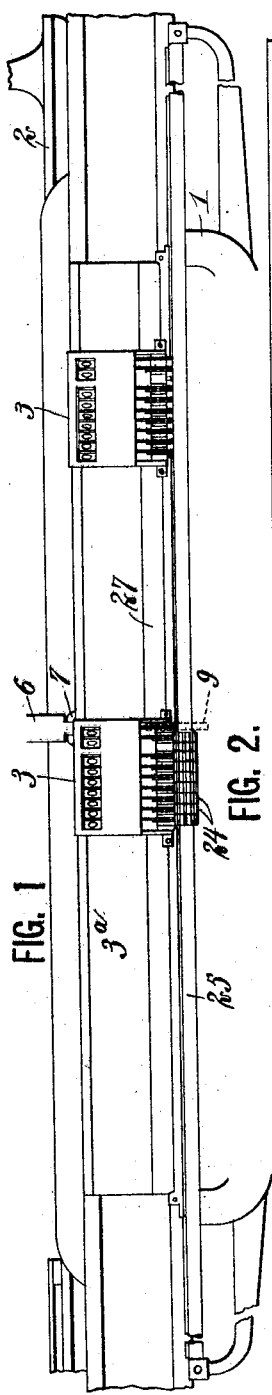
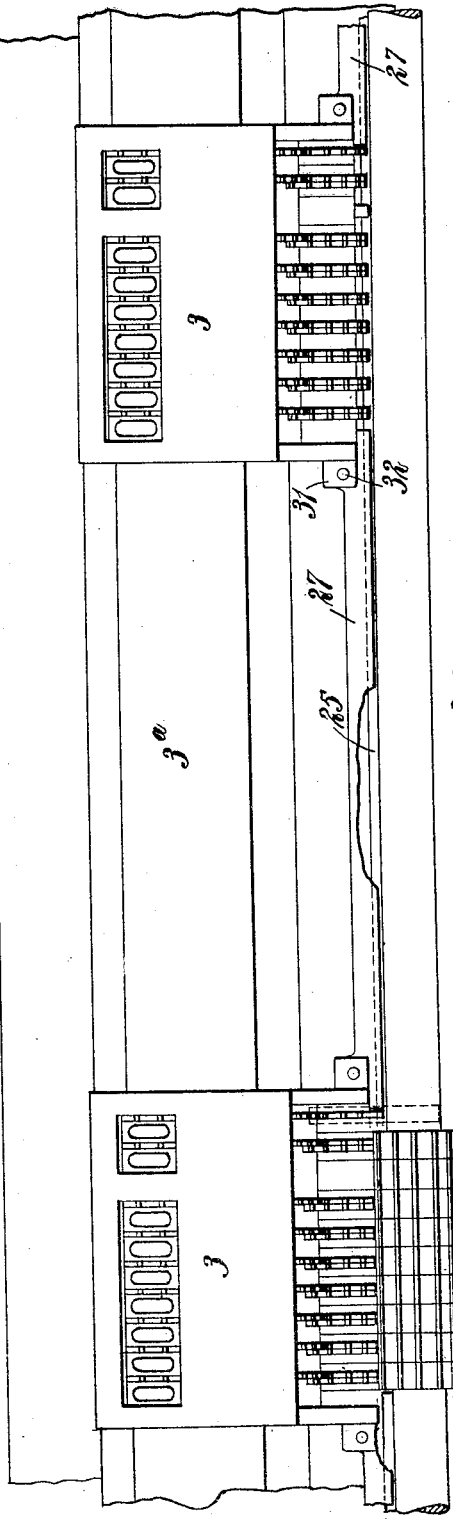
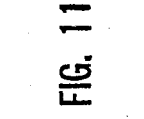
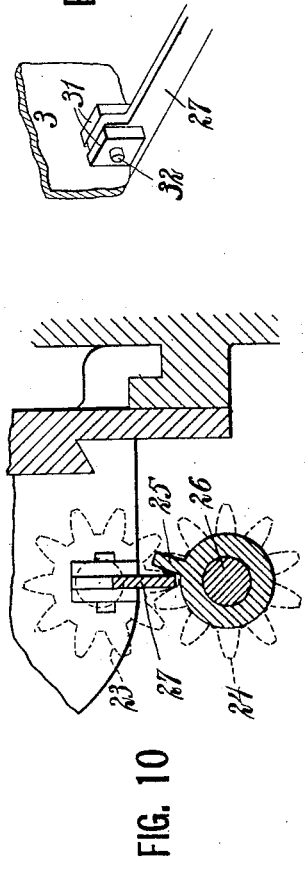
WITNESSES:
F. D. Sweet.
F. C. Alexander
INVENTOR:
Walter Wright
BY
B. C. Stickney
ATTORNEY W. WRIGHT.
COMPUTING MACHINE.
APPLICATION FILED MAR. 8, 1912.
1,261,088.
Patented Apr. 2, 1918.
3 SHEETS—SHEET 2.
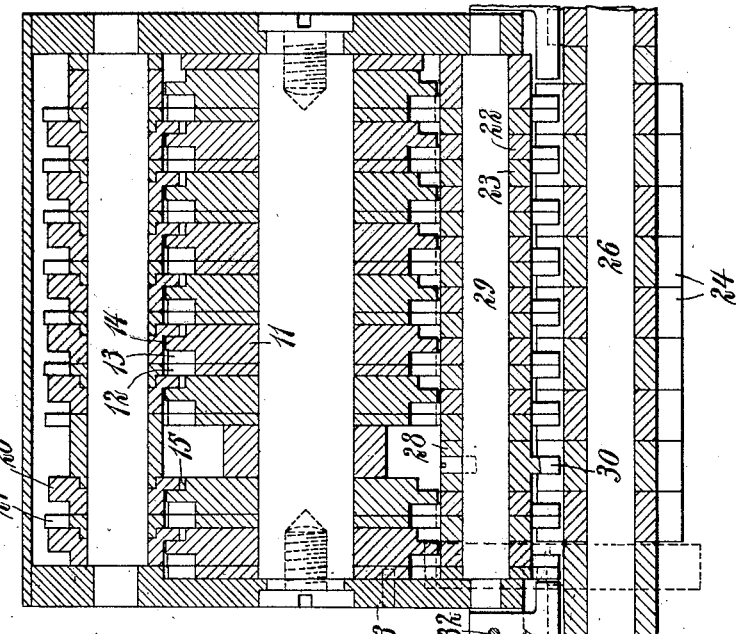
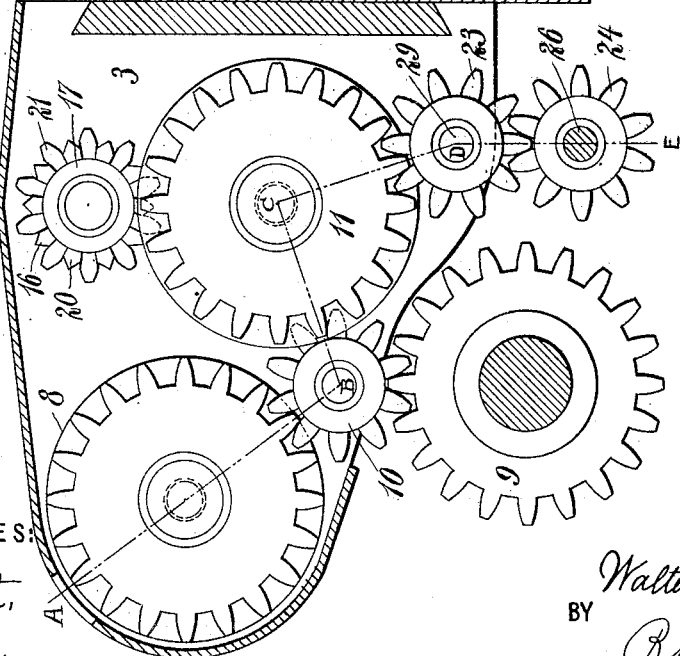
WITNESSES:
F. D. Sweet,
F. C. Alexander
INVENTOR:
Walter Wright
BY
B. C. Stickney
ATTORNEY

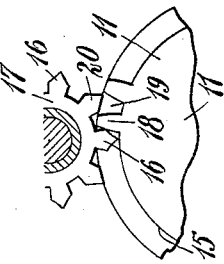
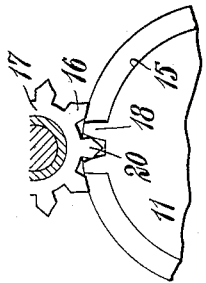
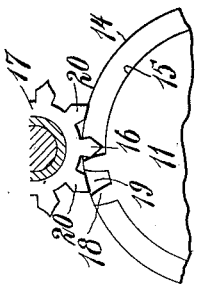
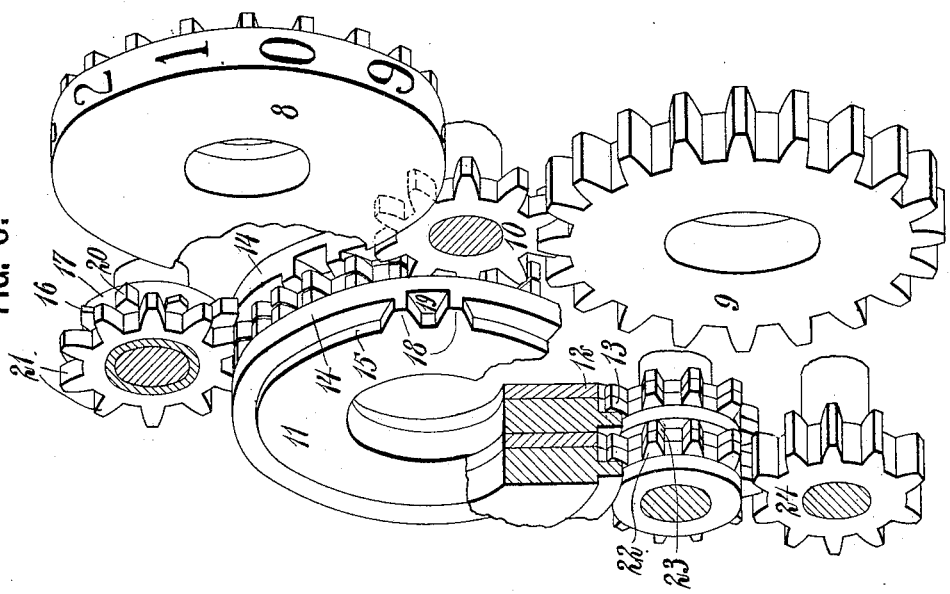
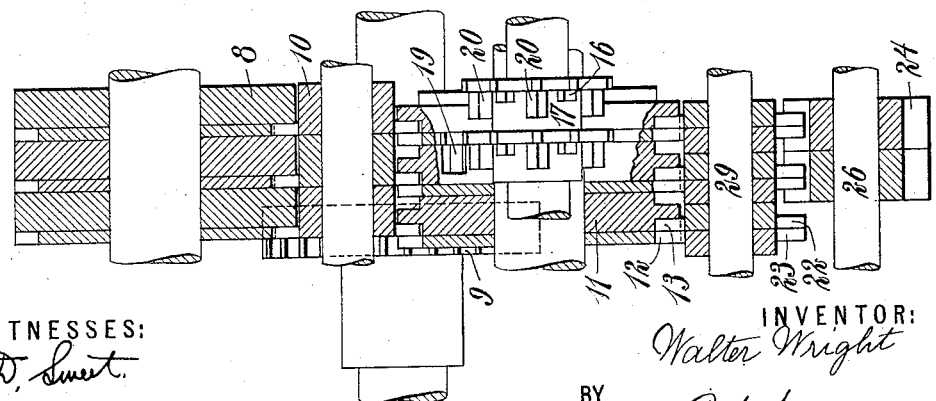

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMPUTING-MACHINE.

1,261,088. Specification of Letters Patent. Patented Apr. 2, 1918.

Application filed March 8, 1912. Serial No. 682,334.

*To all whom it may concern:*

Be it known that I, WALTER WRIGHT, a citizen of the United States, residing in New York city, in the county of New York and State of New York, have invented certain new and useful Improvements in Computing-Machines, of which the following is a specification.

This invention relates to computing machines and is herein disclosed as applied to a computing head of the master wheel type, in which the master wheel operates *seriatim* on the periphery of a series of computing wheels or of drivers therefor.

The invention is herein disclosed substantially as an improvement on co-pending application 642,183, filed August 3, 1911, in which case a master wheel is disclosed as operating *seriatim* on the dial wheels of a computing head, and in which a carry-over mechanism is disclosed which positively locks said dial wheels unless they are actually driven by the master wheel.

In said application the computing wheels are shown as made up of two independently moving parts, one of which may be driven by the master wheel; the other meshing with a gear on a carry-over wheel. In the present invention these two parts are caused to act in unison by means of a coupling device which is preferably situated outside of the computing wheels. The master wheel is also preferably located outside of said computing wheels, and the latter are preferably supported on an idle shaft.

Preferably the dial wheels are made separate from the computing wheels, thus enabling them to have broad surfaces on which the numerals may be placed.

The coupling devices above described are preferably formed as idle gear wheels which are arranged to mesh successively with the two parts of each computing wheel, or with gears separately meshing with each of said parts. These idle couplers, in an ordinary computing head, will extend to the left of the master wheel and will be sufficient in number so that one engages with every computing wheel higher in denomination than the units wheel when the latter is engaged by the master wheel.

A rod may extend in each direction from the computing head between the teeth of the couplers, in order to preserve the alinement of said couplers when not engaged by a computing wheel, so that they will mesh with the gears of the computing wheels as the computing head slides across them. When more than one computing head is used, this rod may be utilized to space said computing heads. In order to hold the computing wheels locked when not engaged either by the master wheel or couplers, preferably a lock is provided which is fixed relatively to the master wheel and is arranged to lock said computing wheels. Said lock, which may be in the form of a bar, is preferably arranged to engage the teeth of the wheel on which the coupling devices operate.

Other features and advantages will hereinafter appear.

In the accompanying drawings,

Figure 1 is a front view of a typewriting machine, showing two computing heads attached thereto.

Fig. 2 is an enlarged view of part of Fig. 1.

Fig. 3 is a vertical section through a computing head.

Fig. 4 is a vertical section at right angles to Fig. 3.

Fig. 5 is a section on the broken line A—B—C—D—E of Fig. 3.

Fig. 6 is a perspective view, showing a dial wheel and certain associated parts.

Figs. 7, 8 and 9 are views of a carry-over wheel in its successive positions.

Fig. 10 is a section, showing locking means.

Fig. 11 is a detail of parts shown in Fig. 10.

In the present disclosure the invention is shown as applied to a combined typewriting and computing machine, in which 1 represents part of the frame of an Underwood typewriting machine on which travels the typewriter carriage 2 carrying with it totalizers 3 on a totalizer carriage 3ª having arms 4 which ride in grooves 5 on said typewriter frame. The computing heads or totalizers 3 are carried along by said carriage 2 by means of an arm 6 riding in a yoke 7 on the totalizer carriage.

In said totalizers, dial wheels 8 are turned *seriatim* by a master wheel 9 of which there is one on the typewriter. The master wheel operates each dial wheel 8 through an intermediate wheel 10, of which there is one for every dial wheel. Said intermediate wheels 10 likewise each mesh with a computing wheel 11 on which the carry-over and locking mechanism operates.

Each computing wheel is herein shown as formed of two parts 12 and 13, the part 12 consisting of a loose gear lying against the face of the main part of the computing wheel nearest the wheel next lower in denomination. The main part or body 13 of the computing wheel comprises a gear cut on the periphery nearest the loose gear 12. On said main part or body is also formed a smooth periphery 14 which is cut away to form a ledge 15 forming a groove in which ride one of the thin teeth 16 of a carry-over wheel 17. Extending from said ledge 15 are formed two teeth 18 between which is a wide, deep depression 19 into which a broad tooth 20 on said carry-over wheel may sink. As the body part 13 turns around, the thin tooth 16 on the carry-over wheel rides in the groove aforesaid, until it is struck by a tooth 18. Said carry-over wheel then begins to turn and its broad tooth 20 sinks into the depression 19, and the carry-over wheel continues to turn until the next broad tooth 20 strikes on the periphery 14 with which it forms a Geneva lock; and it is locked by said periphery until the said body part 13 has completed one revolution and the depression 19 and teeth 18 again come around with it.

In being thus turned the distance between two broad teeth once in each revolution, said carry-over wheel turns the adjoining loose gear 12 with which teeth 21, affording a gear forming a part of said carry-over wheel 17, are in mesh; and if said loose gear 12 is locked to the body part 13 of the adjoining computing wheel, said body part will turn with it and thus make a carry-over on said computing wheel. In this way, once in each revolution, a computing wheel is turned by the adjoining one below through one space. This constitutes a carry-over, and in a decimal system of wheels said carry-over wheel is arranged to turn the adjoining computing wheel preferably one-tenth of a revolution each time it moves it.

In order to lock each loose gear above the master wheel to its associated body part 13, an idle gear wheel 22 is arranged to mesh with each computing wheel body, and an idle gear 23 is arranged to mesh with its loose gear, and these two idle gears mesh in turn with a broad toothed idle pinion 24 which forms a coupler. Thus said loose gears 22 and 23 when engaged by an idle pinion 24, must revolve as a unit, and the two parts of the computing wheel that they are respectively in mesh with must also revolve as a unit. It may be said that the parts 12 and 13 form a composite computing wheel, parts of which are capable of relative rotation, but when connected by the coupler elements 22, 23 and 24, they rotate as a unit.

Not only does the part 13 of the computing wheel 11 take part in the carrying operation and in the coupling operation, but the teeth thereon constitute a driving gear by which the computing wheel 11 is turned by the master wheel through the idle gear 10.

When the units dial wheel is driven by the master wheel, said couplers 24 are so arranged that there is one coupler for every wheel in the totalizer higher in denomination; and as the totalizer travels over the master wheel, it travels past said couplers, so that every wheel above the master wheel is engaged by a coupler, while those below the master wheel are free from said couplers.

A bar 25, preferably formed as a fixed sleeve on the rod 26 carrying the couplers 24, extends to the right of the master wheel and another identical bar extends from the highest coupler in denomination to the limit of travel of the totalizers. This bar is arranged to enter between the teeth on idle gears 22 and 23 and lock them and the computing wheels controlled by them when not engaged by said master wheel or any of said couplers.

A bar 27 extends on each side of a totalizer and is arranged to enter between teeth on the couplers 24 and preserve said couplers alined, so that as the totalizer slides onto them, the teeth on said couplers will mesh with the teeth on the idle gears. By means of these locking bars, it is therefore evident that the positive meshing of all parts of the combined machine is insured.

In the couplers herein shown, a space is provided just above the second computing wheel in which a period may be placed in writing dollars and cents and in which there is no computing wheel. The carry-over wheel for carrying from dimes to dollars may be made with a long hub so as to insure proper meshing with the computing wheels which may be identical for dimes, dollars, and tens of dollars, etc. As there is no computing wheel at this decimal point, the coupler momentarily at that space is held properly alined by means of a collar 28 fast on the fixed shaft 29 on which the idle gears 22 and 23 revolve; and a tooth 30 extending from said collar enters between the teeth of the coupler 24 and holds it centered in precisely the manner that the bar 27 holds the couplers outside of the totalizer.

The idle wheel 12 for the units wheel is of course never operated by a carry-over wheel, and may be held against rotation by a pin 33 in the wall of the totalizer. Thus it holds the idle wheel 23 in mesh with it against rotation and therefore, when a coupler engages the units wheel, said wheel is locked against rotation:

The operation may be outlined as follows:

The master wheel 9 turns a dial wheel 8 by means of the intermediate wheel 10, which intermediate wheel also drives the computing wheel 11. If said computing wheel is in the position shown in Fig. 7 and revolves farther to the left, the tooth 18 will strike the thin tooth 16 which has been riding in the groove formed by the ledge 15 and swing the broad tooth 20 down into the depression 19, as shown in Fig. 8. The computing wheel continues turning the carry-over wheel by pushing said tooth 20 with the other tooth 18, until the next broad tooth 20 strikes the periphery 14 against which it locks, and the next thin tooth 16 has in the meantime entered the groove formed by the ledge 15, (see Fig 9), so that when the next tooth 18 comes around, the carry-over wheel will again be turned. In thus turning, the teeth 21 on the carry-over wheel have turned the loose gear 12 which is adjacent the next computing wheel higher in denomination, and said loose gear is forced to revolve and drive with it the main part of the computing wheel, so that a carry-over is made, which will be transmitted to the corresponding dial wheel through the intermediate wheel.

In Fig. 1 are shown two totalizers which may be spaced from each other by means of the bar 27 which enters between gears 31 on the totalizers and is locked thereto by means of a pin 32.

Variations may be resorted to within the scope of the invention, and portions of the improvements may be used without others.

I claim:

1. In a computing machine, the combination, with a series of computing wheels, and a master wheel for driving the same *seriatim;* of a carry-over mechanism; a loose member co-axial with each computing wheel and driven by said carry-over mechanism; a coupler for joining each computing wheel and its associated loose member; and a split interponent between each coupler and its associated computing wheel and loose member, said interponent having one of its component parts engaging the loose member and driven thereby, and the other engaging and driving the computing wheel, both sections engaging the coupler.

2. In a computing machine, the combination, with a series of computing wheels, and a master wheel for driving the same *seriatim;* of a carry-over mechanism; a loose member co-axial with each computing wheel and driven by said carry-over mechanism; a pair of companion members associated with each computing wheel and its respective loose member and disposed externally thereof, one of such companion members engaging the loose member and driven thereby, and the other engaging and driving the computing wheel; and an external coupler for joining each pair of companion members engaging both members of the pair.

3. In a computing machine, the combination, with a series of computing wheels, each having a peripheral series of teeth, and a master wheel for driving said wheels *seriatim;* of a carry-over mechanism; a peripherally-toothed, loose gear co-axial with each computing wheel and driven by said carry-over mechanism; a toothed coupler for joining each computing wheel and its associated gear; and an interponent between each coupler and the corresponding computing wheel and gear, each interponent comprising a pair of separate gear sections, one section meshing with the teeth on the computing wheel, and the other section with the teeth on the gear, both sections meshing with the coupler teeth.

4. In a computing machine, the combination, with a series of computing wheels, each having a peripheral series of teeth, and a master wheel for driving said wheels *seriatim;* of a carry-over mechanism; a peripherally-toothed gear disposed loosely against one face of each computing wheel and co-axial therewith, said gear driven by said carry-over mechanism; a toothed coupler for joining each computing wheel and its associated gear; and a pair of relatively-rotatable, co-axial gears interposed between each coupler and the corresponding computing wheel and loose gear and meshing with said coupler, one of said interposed gears meshing with and driven by said loose gear, and the other interposed gear meshing with and driving said computing wheel.

5. The combination, with a pair of juxtaposed, peripherally-toothed computing wheels, and a peripherally-toothed gear loosely arranged between said computing wheels and co-axial therewith; of a carry-over device for driving said gear normally locked by the computing wheel of lower denomination, but periodically actuated thereby; and an external gear train extending from the periphery of said gear to the periphery of the computing wheel of higher denomination, for driving said computing wheel from said gear when the latter is actuated by said carry-over device.

6. The combination, with a pair of juxtaposed, peripherally-toothed computing wheels, and a peripherally-toothed gear loosely arranged between said computing wheels and co-axial therewith; of a carry-over device for driving said gear normally locked by the computing wheel of lower denomination, but periodically actuated thereby; a gear meshing with and driven by the teeth on the loose gear when the latter is actuated by the carry-over device; a gear co-axial with the last-named gear meshing with and driving the teeth on the computing wheel of higher denomination; and a coupler for said co-axial gears, to cause rotation thereof in unison.

7. The combination, with a pair of juxtaposed, peripherally-toothed computing wheels, and a peripherally-toothed gear loosely arranged between said computing wheels and co-axial therewith; of a carry-over device having a toothed portion normally locked by the peripheral surface of the computing wheel of lower denomination, but periodically actuated by said wheel, and a second toothed portion engaging the teeth on said gear to drive the same; and an external gear train extending from the periphery of said gear to the periphery of the computing wheel of higher denomination, for driving said computing wheel from said gear when the latter is actuated by said carry-over device.

8. The combination, with a pair of juxtaposed, peripherally-toothed computing wheels, and a peripherally-toothed gear loosely arranged between said computing wheels and co-axial therewith; of a carry-over device having a toothed portion normally locked by the peripheral surface of the computing wheel of lower denomination, but periodically actuated by said wheel, and a second toothed portion engaging the teeth on said gear to drive the same; a gear meshing with and driven by the teeth on the loose gear when the latter is actuated by the carry-over device; a gear co-axial with the last-named gear meshing with and driving the teeth on the computing wheel of higher denomination; and a coupler for said co-axial gears, to cause rotation thereof in unison.

9. In a computing machine, the combination, with computing wheels, of a master wheel for driving them *seriatim*, a loose wheel co-axial with each computing wheel above the units wheel, a carry-over mechanism driving each loose wheel from the adjoining computing wheel, a coupler geared to each computing wheel and its loose wheel to compel them to rotate as a unit when in the computing zone, means for holding said couplers alined when outside the computing zone, and a fixed member holding any coupler alined occupying a letter-space between two computing wheels.

10. In a computing machine the combination with a plurality of computing wheels, of a driving gear coaxial with each wheel, a normally idle gear also coaxial with said computing wheel, carrying mechanism, means acting through said driving gear and said idle gear for coupling a computing wheel of lower order to a computing wheel of higher order during a carrying operation, and means also coöperative with said driving gear for actuating the same.

11. A totalizer having denominational units, each unit comprising a computing wheel, a driving gear coaxial therewith and fixed thereto, and a loose gear also coaxial with said computing wheel, carrying mechanism, coupling devices for coupling together a computing wheel of lower order and a loose gear of higher order, and said coupling devices acting through the medium of said fixed gear during a carrying operation, and means acting to drive any computing wheel also acting through the medium of said fixed gear.

12. The combination with a series of composite computing wheels, each computing wheel comprising relatively-movable parts, of a split interponent engaging said parts of said wheel, an external master wheel for driving said computing wheel, and external coupling means for engaging said split interponent to thereby temporarily unite the parts of the individual computing wheel so that they will rotate in unison, said split interponent and said coupling means having relative traveling movement so that the parts of the successive computing wheels will be united individually and successively.

13. In a computing machine, the combination of a series of computing wheels including a units wheel, a master wheel arranged to drive *seriatim* said computing wheels, a carry-over mechanism forming at times a locking train for said computing wheels, so that each computing wheel may be locked from the one below, and a train for the units wheel having a fixed member, so as to be incapable of carrying over in respect to said units wheel but forming a locking train for said units wheel.

14. The combination with a series of computing wheels including a units wheel, of a train to said units wheel, said train being normally interrupted and having a fixed element, and coupling means for joining said train to said units wheel so as to lock said units wheel against rotation.

15. The combination of a plurality of computing heads, each comprising a series of computing wheels, a series of coupling members for joining relatively-movable parts of said computing heads to rotate in unison, and a bar connecting said computing heads to move in unison and engaging said coupling members when the latter are out of engagement with said computing heads to hold the several coupling members in register and in alinement with one another.

16. In a computing machine, the combination with a series of computing wheels, of carry-over mechanism, a loose gear coaxial with each computing wheel and driven by said carry-over mechanism, said computing wheel having a Geneva locking surface, and the ends of the teeth of said loose gear lying in the same cylindrical surface with said Geneva locking surface, a coupler for joining each computing wheel and its associated loose gear, and a split interponent between each coupler and its associated computing wheel and loose gear, said interponent having one of its component parts engaging the loose gear and driven thereby, and the other engaging and driving the computing wheel, both parts engaging the coupler, said coupler and said interponent having relative traveling movement so that said computing wheel and its loose gear will be united successively during the relative traveling movement.

17. In a computing machine, the combination with a traveling carriage and a plurality of totalizers, of a master wheel for operating said totalizers *seriatim*, carry-over devices associated with each totalizer, said carry-over devices being normally broken or interrupted, a single set of rotatable couplers associated with said master wheel for completing all totalizers, and means connecting said totalizers comprising devices for preventing accidental rotation of said couplers.

18. In a computing machine, the combination with a traveling carriage and a plurality of totalizers, of a master wheel for operating said totalizers *seriatim*, carry-over devices associated with each totalizer, said carry-over devices being normally broken or interrupted, a single set of rotatable couplers associated with said master wheel for completing all totalizers, means connecting said totalizers comprising devices for preventing accidental rotation of said couplers, and devices for preventing the carry-over devices from becoming misplaced when freed from the couplers out of the computing zone.

19. In a computing machine, the combination, with computing wheels, and a master wheel for driving them *seriatim;* of a carry-over mechanism; a loose gear individual to each computing wheel, co-axial therewith and driven by said carry-over mechanism; a pair of idle gears associated with each computing wheel and its loose gear; a series of couplers for joining said idle gears together to rotate in unison, said couplers and said computing wheels having relative traveling movement therebetween, so that the gears of the successive pairs will be coupled individually and successively; and a bar fixed with reference to said computing wheels for locking said couplers in alinement.

20. In a computing machine, the combination, with computing wheels, and a master wheel for driving them *seriatim;* of a carry-over mechanism; a loose gear individual to each computing wheel, co-axial therewith and driven by said carry-over mechanism; a pair of idle gears associated with each computing wheel and its loose gear; a series of couplers for joining said idle gears together to rotate in unison, said couplers and said computing wheels having relative traveling movement therebetween, so that the gears of the successive pairs will be coupled individually and successively; and a bar fixed with reference to said master wheel and engageable with said idle gears, to lock the same and said computing wheels against rotation when respectively free of engagement with said couplers and said master wheel.

21. In a computing machine, the combination, with computing wheels, and a master wheel for driving them *seriatim;* of a carry-over mechanism; a loose gear individual to each computing wheel, co-axial therewith and driven by said carry-over mechanism; a pair of idle gears associated with each computing wheel and its loose gear; a series of couplers for joining said idle gears together to rotate in unison, said couplers and said computing wheels having relative traveling movement therebetween, so that the gears of the successive pairs will be coupled individually and successively; a bar fixed with reference to said computing wheels for locking said couplers in alinement; and a bar fixed with reference to said master wheel and engageable with said idle gears, to lock the same and said computing wheels against rotation when respectively free of engagement with said couplers and said master wheel.

22. The combination, with a plurality of spaced computing heads, each comprising a series of computing wheels having relatively-movable component parts; of a series of toothed couplers for joining said parts to rotate in unison; and a bar connecting said computing heads to move in unison relatively to said couplers, said bar engaging the teeth of said couplers when the latter are out of engagement with said computing heads, so as to hold the several couplers in register and in alinement with one another.

23. The combination, with a plurality of spaced computing heads, each comprising a series of computing wheels each having a pair of peripherally-toothed, relatively-movable component parts; of a pair of toothed idlers individual to each pair of relatively-movable parts and in mesh therewith; a series of toothed couplers for joining said idlers to rotate in unison; and a bar connecting said computing heads to move in unison relatively to said couplers, said bar engaging the teeth of said couplers when the latter are out of engagement with said computing heads, so as to hold the several couplers in register and in alinement with one another.

24. The combination, with a plurality of spaced computing heads, each comprising a series of computing wheels each having a pair of peripherally-toothed, relatively-movable component parts; of a pair of toothed idlers individual to each pair of relatively-movable parts and in mesh therewith; a series of toothed couplers for joining said idlers to rotate in unison; a shaft whereon said couplers are mounted; a bar sleeve on said shaft and engaging the teeth of said idlers, to lock the same and the computing wheels controlled thereby when said idlers are out of engagement with said couplers; and a bar connecting said computing heads to move in unison relatively to said couplers, the last-named bar engaging the teeth of said couplers when the latter are out of engagement with said computing heads, so as to hold the several couplers in register and in alinement with one another.

WALTER WRIGHT.

Witnesses:
EDWARD THOMAS,
LORENZ L. PRITZL.

Copies of this patent may be obtained for five cents each, by addressing the "Commissioner of Patents, Washington, D. C."